United States Patent [19]
Koda et al.

[11] Patent Number: 4,954,915
[45] Date of Patent: Sep. 4, 1990

[54] AUTOMATIC CASSETTE CHANGER

[75] Inventors: Atsushi Koda; Shinji Okuda; Wataru Nonaka, all of Kanagawa, Japan

[73] Assignee: Sony Corporation, Tokyo, Japan

[21] Appl. No.: 232,804

[22] Filed: Aug. 16, 1988

[30] Foreign Application Priority Data

Aug. 18, 1987 [JP] Japan .............................. 62-125258[U]
Aug. 26, 1987 [JP] Japan .............................. 62-129848[U]

[51] Int. Cl.$^5$ ............................................. G11B 15/68
[52] U.S. Cl. ................................................... 360/92
[58] Field of Search ......................... 360/92, 69, 71, 79

[56] References Cited

U.S. PATENT DOCUMENTS 4,731,682  3/1988  Nishiyama et al. .................... 360/92
4,837,647  6/1989  Nonaka et al. ......................... 360/92

FOREIGN PATENT DOCUMENTS 0242144  10/1987  European Pat. Off. ............... 360/92

Primary Examiner—John H. Wolff
Attorney, Agent, or Firm—Lewis H. Eslinger; Jay H. Maioli; Donald S. Dowden

[57] ABSTRACT

An automatic cassette changer includes a large number of cassette storing racks in each of which a cassette is stored, a cassette transporter, and a recording and reproducing device. Automatic selective exchanging of cassettes between the cassette storing racks and the recording and reproducing device is performed by the cassette transporter. The changer has a sliding member that moves from a retracted position to an extended position and thereby moves a cassette pressing member from a retracted position to an extended position against the bias exerted by return springs so that a cassette stored in a cassette storing rack may be pushed out towards the cassette transporter by the cassette pressing member. However, the return springs avoid the possibility that a cassette stored in the cassette storing rack will accidentally jump out toward the cassette transporter and thus prevent accidental collision between the cassette and the cassette transporter.

7 Claims, 15 Drawing Sheets

FIG. 12

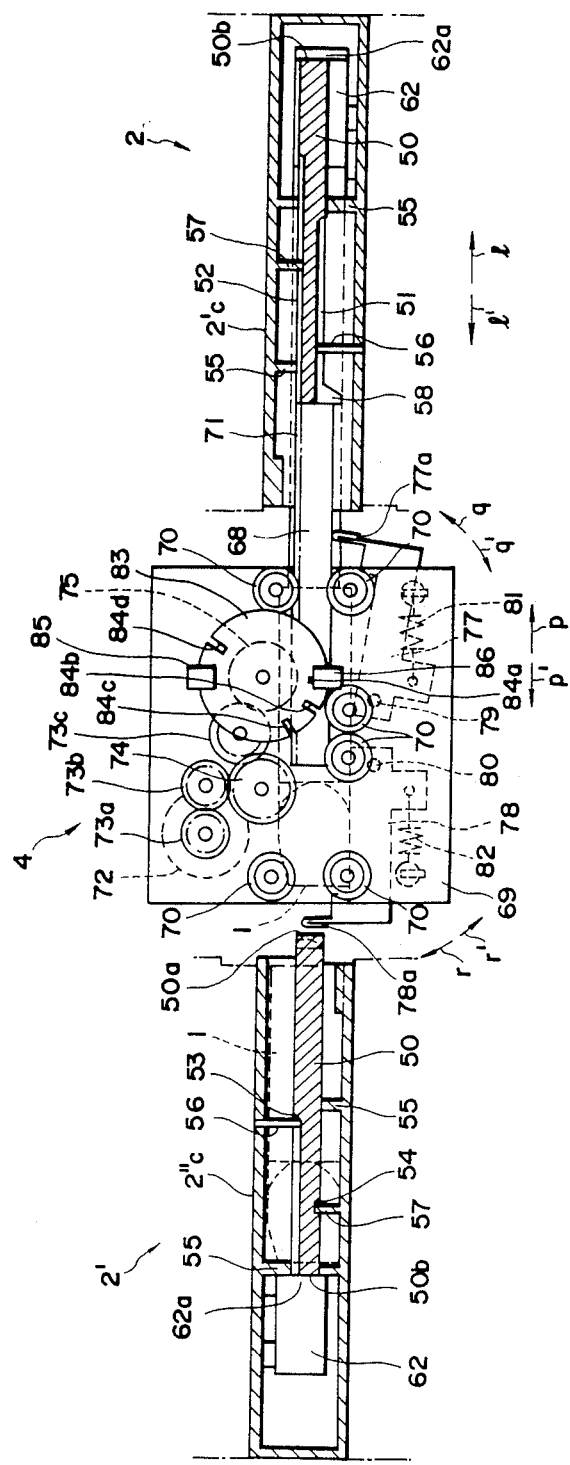

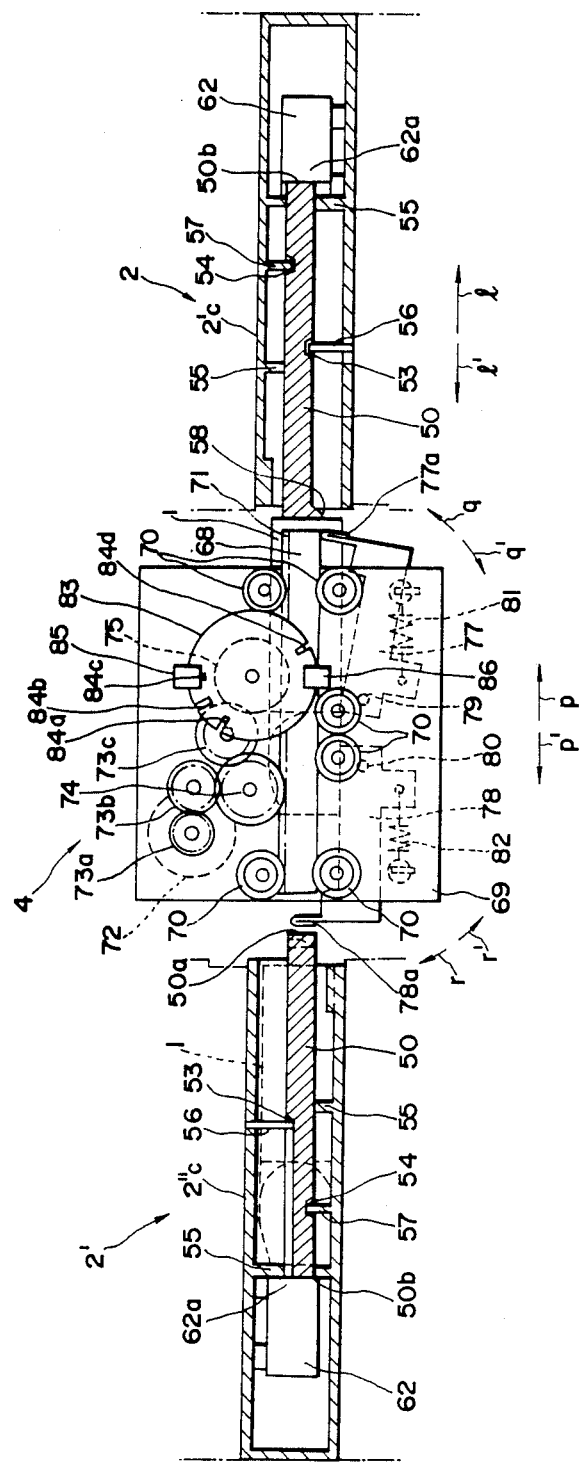

AUTOMATIC CASSETTE CHANGER

BACKGROUND OF THE INVENTION

1. Field of the Invention

This invention relates to an automatic cassette changer for loading a selected one of a plurality of cassettes each stored in a cassette storing rack onto a reproducing device or a recording device.

2. Description of the Prior Art

Automatic cassette changers wherein a desired one of a plurality of video cassettes each stored in a cassette storing rack is loaded onto a reproducing device by means of a cassette transporting means are already known and disclosed, for example, in Japanese Patent Laid-Open No. 60-182046, Japanese Patent Laid-Open No. 62-146460 and so on.

In such conventional automatic cassette changers, a cassette in a cassette storing rack is pushed out into a cassette transporting means by means of a spring for a cassette pushing out member provided in the cassette storing rack. On the contrary, when the cassette is returned into the cassette storing rack from the cassette transporting means, the force required to push out the cassette from the cassette storing rack is charged in the spring for the cassette pushing out member by the cassette itself being stored into the cassette storing rack. The cassette pushing out member is thus locked by a locking mechanism in a condition wherein the cassette is stored in position in the cassette storing rack. The locking condition of the locking mechanism is canceled by an unlocking means provided on the cassette transporting means, and if the locking condition is canceled, the cassette pushing out member is moved from a position spaced away from the cassette transporting means toward the cassette transporting means by the spring therefor. Upon such movement of the cassette pushing out member, it pushes out the cassette from within the cassette rack into the cassette transporting means.

With a conventional automatic cassette changer of the type mentioned just above, however, if the locking condition of the locking mechanism should inadvertently be canceled by some accident, then the cassette pushing out member is inadvertently moved from the position spaced away from the cassette transporting means toward the cassette transporting means by the cassette pushing out spring so that the cassette is inadvertently pushed out from the cassette storing rack toward the cassette transporting means. Consequently, the cassette transporting means will collide with the cassette thus pushed out from the cassette storing rack so that both or either one of the cassette transporting means and the cassette may be damaged or broken.

SUMMARY OF THE INVENTION

It is a principal object of the present invention to provide an automatic cassette changer wherein a cassette stored in a cassette storing rack will not possibly be moved inadvertently toward a cassette transporting means.

It is another object of the present invention to provide an automatic cassette changer wherein a cassette storing rack includes a cassette pushing out member which operates surely with a simplified structure.

It is a further object of the present invention to provide an automatic cassette changer wherein a cassette storing rack includes a cassette pushing out mechanism which has a simplified structure and will not damage a side wall of a cassette.

It is a still further object of the present invention to provide an automatic cassette changer wherein a cassette can be freely drawn out of a cassette storing rack in a direction away from a cassette transporting means side.

It is a yet further object of the present invention to provide an automatic cassette changer wherein a cassette storing rack includes a locking mechanism and an unlocking mechanism for a cassette disposed in a very small spacing therein.

In order to attain the principal object of the present invention specified as above, according to the present invention, there is provided an automatic cassette changer which includes a plurality of cassette storing racks each for storing a cassette therein, a cassette transporting means for feeding a cassette, and a recording or reproducing device, wherein each of the cassette storing racks includes a sliding member disposed to be pushed by a pressing means provided on the cassette transporting means to move in a direction away from the cassette transporting means, and a cassette pressing member having an end for contacting with part of the sliding member and disposed to be moved in a direction toward the cassette transporting means by a distance proportional to the amount of movement of the sliding member by the sliding member, the cassette pressing member having at an end portion thereof remote from the cassette transporting means an abutting portion for contacting with a face of the cassette stored in the cassette storing rack.

In order to attain the other objects of the present invention described hereinabove, according to the present invention, there is provided an automatic cassette changer which includes a plurality of cassette storing racks each for storing a cassette therein, a cassette transporting means for feeding a cassette, and a recording or reproducing device, wherein each of the cassette storing racks has a guide portion for guiding a spiral guided portion formed on an outer periphery of a locking member in the form of a rod such that, as the locking member is rotated in a circumferential direction, the locking member may be moved in directions of an axis thereof which substantially coincide with directions in which the cassette is stored into and discharged from the cassette storing rack, and the locking member having a locking portion extending substantially in a perpendicular direction to the direction of the axis thereof from an end portion thereof adjacent the cassette transporting means, the locking portion being disposed to contact with a side face of the cassette stored in the cassette storing rack adjacent the cassette transporting means.

The above and other objects, features and advantages of the present invention will become apparent from the following description and the appended claims, taken in conjunction with the accompanying drawings.

BRIEF DESCRIPTION OF THE DRAWINGS

FIG. 12 is a horizontal sectional view of the automatic cassette changer of FIG. 10;

FIG. 15 is a similar view but illustrating a cassette discharging operation of the cassette storing rack of FIG. 13; and FIG. 16 is a similar view but illustrating a storing operation of a cassette from a cassette transporting means into the cassette storing rack of FIG. 13.

DETAILED DESCRIPTION OF THE PREFERRED EMBODIMENTS

Figure 2:
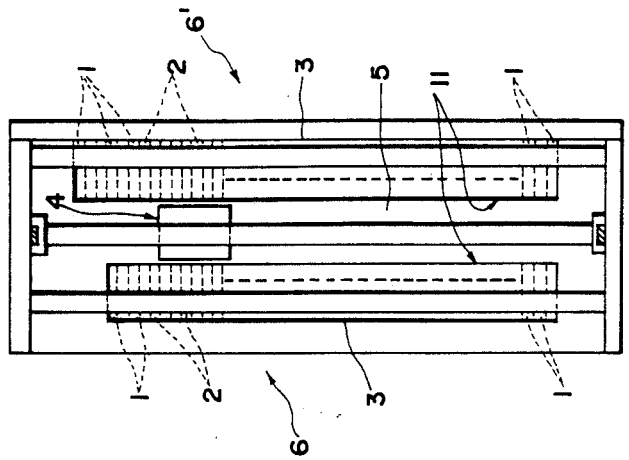
FIG. 2 is a side elevational view of the automatic cassette changer of FIG. 1.
Figure 1:
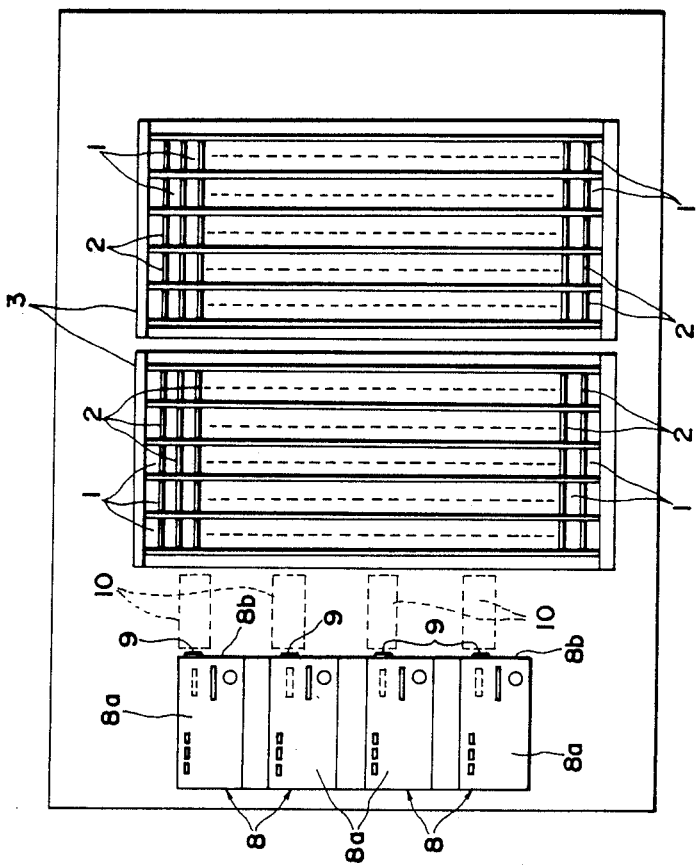
FIG. 1 is a front elevational view of an automatic cassette changer showing a preferred embodiment of the present invention.

Referring first to FIGS. 1 and 2, there is shown an entire automatic cassette changer according to the present invention. The automatic cassette changer shown is a large size machine in which a large number, up to several hundreds, of cassettes 1 are stored. A plurality, four in the embodiment shown, of rack blocks 3 are disposed in a juxtaposed relationship in two rows on each of front and rear sides, and each of the rack blocks 3 includes a large number of cassette storing racks 2 mounted thereon for storing a large number of cassettes 1 in a large number of rows (30 to 50 rows) and columns (5 to 10 columns). A cassette transporting means 4 is disposed between the rack blocks 3 for movement along a passage 5 which extends in upward and downward directions and in leftward and rightward directions in FIG. 1. The two rack blocks 3 disposed on the front side (operator side) 6 are designed for opening and closing movement toward and away from the front side 6 around opposited end edges thereof while the other two rack blocks 3 disposed on the back side 6' are fixed. A large number of recording and reproducing devices 8 such as cassette type video tape recorders are disposed in a vertical column on a side portion of the automatic cassette changer. Each of the recording and reproducing devices 8 is designed such that an operation was 8a thereof on which various operation buttons, indicators and so on are provided is disposed on the front side 6 and a cassette insertion opening 9 is formed in a side wall 8b thereof on the cassette transporting means 4 side. A plurality of cassette turning devices 10 are disposed in a vertical column in an opposing relationslhip to the cassette insertion openings 9 of the individual recording and rerproducing devices 8 between the individual recording and reproducing devices 8 and the rack blocks 3.

The cassettes 1 stored in the cassette storing racks 2 of designated addresses are taken out one after another from a cassette transporting means side 11 of each of the large number of cassette storing racks 2 by the cassette transporting means 4 which is moved in upward and downward directions and in leftward and rightward directions in FIG. 1. Then, the cassettes 1 thus taken out are automatically fed by the cassette transporting means 4 and selectively supplied one after another to the individual cassette turning devices 10. Then, the orientations of the cassettes 1 thus supplied are turned by 90 degrees in horizontal planes by the individual cassette turning divices 10 so that the cassettes 1 may match with a cassette loading system of the recording and reproducing devices 8. Thereafter the individual cassettes 1 are selectively supplied one after another in their longitudinal directions into the cassette insertion openings 9 of the individual recording and reproducing devices 8. Then, continuous video reproduction or recording is performed for a long period of time using the plurality of recording and reproducing devices 8. After then, the individual cassettes 1 are returned to the original cassette storing racks 2 of the designated addresses by a sequence of operations reverse to that of the operations described above.

Subsequently, details of the cassette storing racks 2 will be described with reference to FIGS. 3 to 7.

Figure 4:
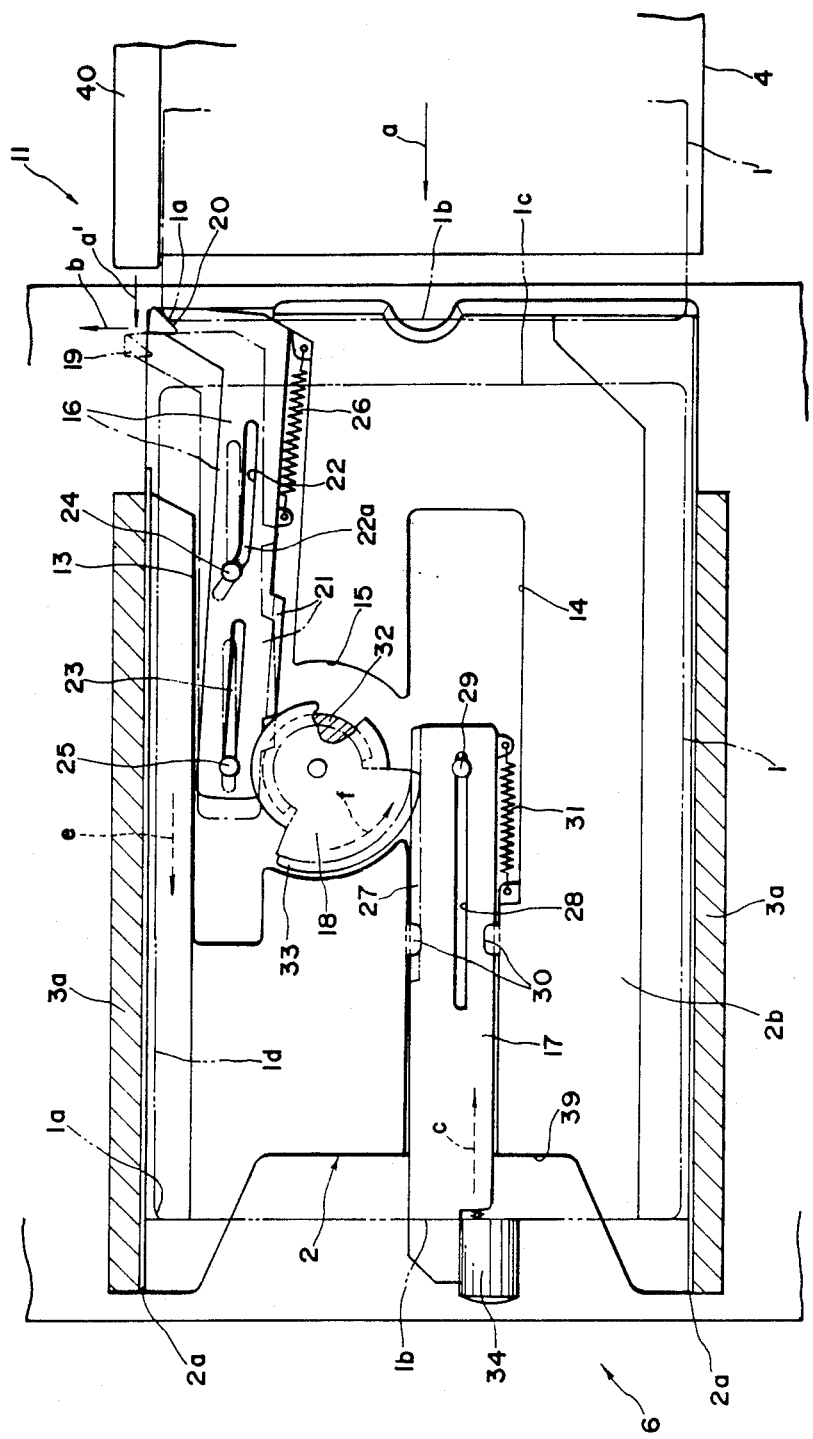
FIG. 4 is a plan view of a cassette storing rack, also in an enlarged scaled, of the automatic cassette changer of FIG. 1.

The cassette storing racks 2 are each mounted at opposite side portions 2a thereof on a pair of side walls 3a of each of the rack blocks 3 and arranged in a vertical column in the rack block 3. Each of the cassette storing racks 2 is molded from a synthetic resin material, and two parallel, substantially linear recesses 13 and 14 are formed on a horizontal upper wall 2b of the cassette storing rack 2 while a substantially circular recess 15 is formed on the horizontal upper wall 2b and extends between the substantially linear recesses 13 and 14, as shown in FIG. 4. A sliding member 16 is disposed in the recess 13, and a cassette pressing member 17 is disposed in the recess 14 while a rotatable member 18 is disposed in the recess 15.

Figure 3:
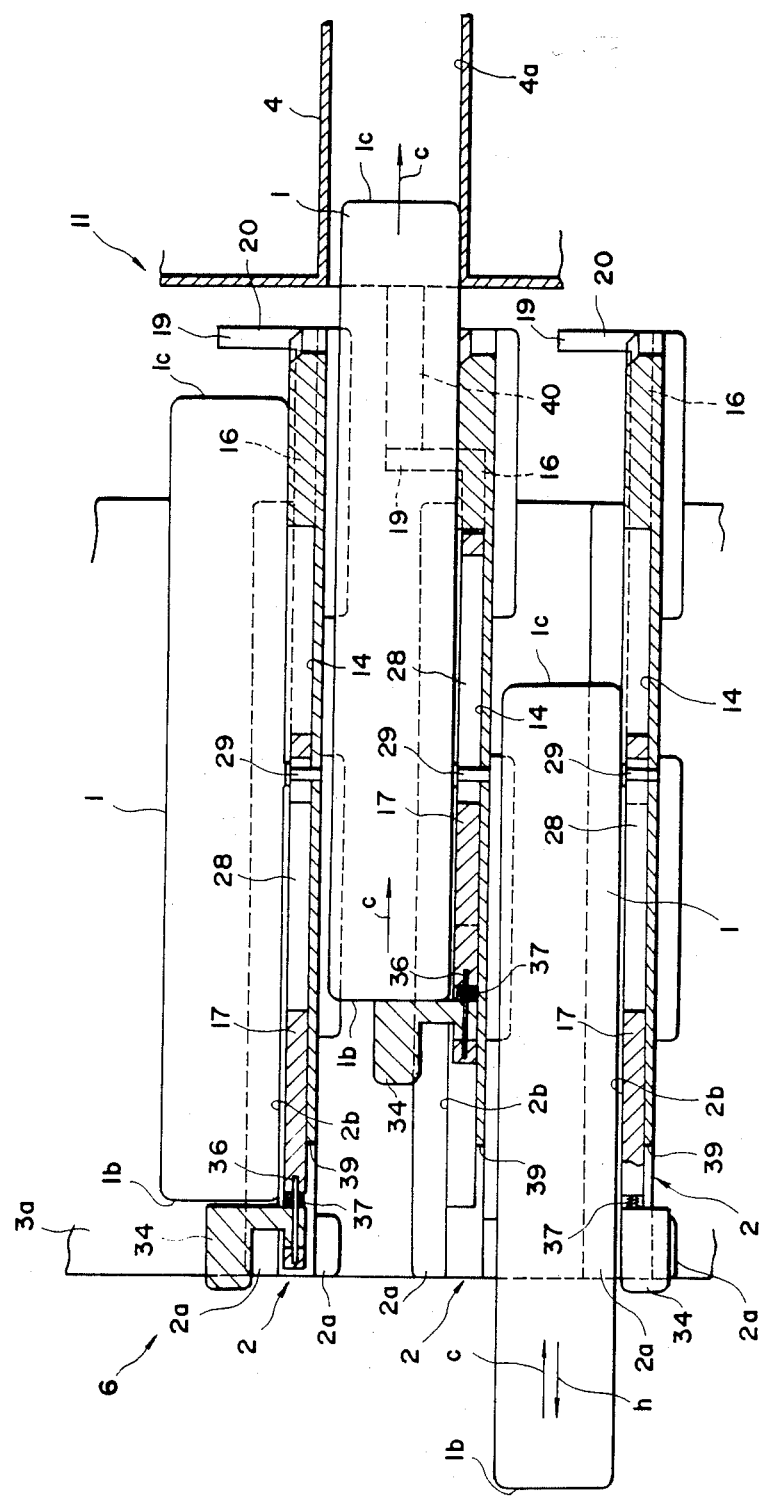
FIG. 3 is a partial vertical sectional view, in an enlarged scale, of the automatic cassette changer of FIG. 1.
Figure 5:
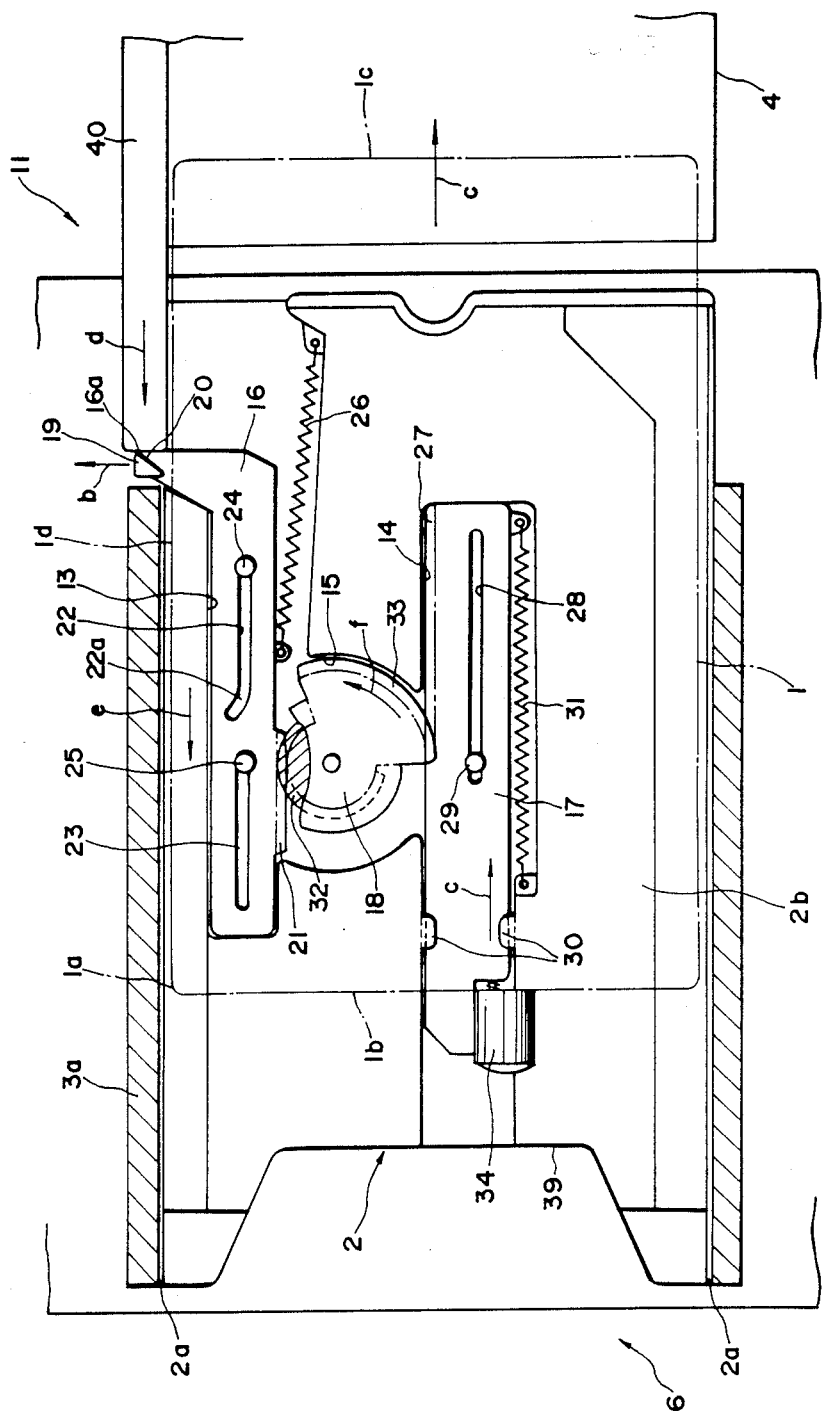
FIG. 5 is a similar view but illustrating a cassette discharging operation of the cassette storing rack of FIG. 4.

The sliding member 16 is formed as a plate from a synthetic resin material. A cassette locking projection 19 is formed in an integral relationship on and extends upwardly from an end portion of the sliding member 16 on its cassette transporting means side as shown in FIG. 3, and a tapered face 20 is formed on the cassette locking projection 19. Meanwhile, a rack 21 is formed in an integral relationship on an inner side edge of the sliding member 16 on the recess 15 side as shown in FIG. 4. The sliding member 16 is loosely fitted, by means of a pair of elongated holes 22 and 23 formed therein, on a pair of guide pins 24 and 25 securely mounted in the recess 13 of the cassette storing rack 2, and an arcuate portion 22a is provided at an end of the elongated hole 22. Accordingly, the sliding member 16 is mounted for movement between a returned or retracted postion near the cassette transporting means as indicated by solid lines in FIG. 4 and an advanced or extended position spaced away from the cassette transporting means as shown in FIG. 5 within the recess 13 under the guidance of the elongated holes 22 and 23 and the guide pins 24 and 25. The sliding member 16 is normally urged to return to the returned position by a tension spring or return spring 26.

The cassette pressing member 17 is formed as a plate from a synthetic resin material, and a rack 27 is formed in an integral relationship on an inner side edge of the cassette pressing member 17 on the recess 15 side as shown in FIG. 4. The cassette pressing member 17 is loosely fitted, by means of an elongated hole 28 formed therein, on a guide pin 29 securely mounted in the recess 14 of the cassette storing rack 2, and a pair of lateral guide tabs 30 are formed on the opposite sides of the recess 14 such that the cassette pressing member 17 may be held between the guide tabs 30 and a bottom face of the recess 14. Accordingly, the cassette pressing member 17 is mounted for movement between a returned or retracted position spaced from the cassette transporting means as shown in FIG. 4 and an advanced or extended position near the cassette transporting means as shown in FIG. 5 with in the recess 14 under the guidance of the elongated hole 28 cooperating with the guide pin 29 as well as the two guide tabs 30. The cassette pressing member 17 is normally urged to return to the returned position by a tensions spring 31 which serves as an urging return spring.

The rotatable member 18 is formed as a gear molded from a synthetic resin material, and a pair of upper and lower sector gears 32 and 33 for engaging with the two racks 21 and 27, respectively, are formed in an integral relationship on the rotatable member 18.

Subsequently, and inserting operation of a cassette 1 into a cassette storing rack 2 will be described.

When the cassette 1 is to be inserted in the direction of an arrow mark a from the cassette transporting means 4 onto the cassette storing rack 2 as shown in long and short dash lines in FIG. 4, a corner 1a of the cassette 1 is first contacted in the direction of an arrow mark a' with the tapered face 20 of the cassette locking projection 19. Thereupon, the cassette locking projection 19 is pushed in the direction of the arrow mark a' so that it escapes in the direction of an arrow mark b by a guiding action of the tapered face 20. The sliding member 16 thus escapes once to a position indicated by long and short dash lines in FIG. 4 against the spring 26 under the guidance of the arcuate portion 22a of the elongated hole 22. Then, when the cassette 1 is inserted fully onto the cassette storing rack 2 as shown in two-dot chain lines in FIG. 4, the sliding member 16 is returned to the returned position shown by solid lines in FIG. 4 by the spring 26.

The cassette pressing member 17 is normally urged to the returned position, that is, a position spaced away from the casette transporting means by the tension spring 31. When the sliding member 16 is in its returned position as indicated by full lines in FIG. 4, the rack 21 thereon is spaced away from the sector gear 32 of the rotatable member 18 so that, even if the sliding member 16 is moved to the position indicated by long and short dash lines in FIG. 4, the cassette pressing member 17 will not be moved to its advanced positon, that is , toward the cassette transporting means side.

When the cassette 1 is inserted fully onto the cassette storing rack 2, the opposite end faces 1c and 1b thereof are respectively contacted with the cassette locking projection 19 on the sliding member 16 and an abutting portion or projection 34 which is formed at and extends perpendicularly from an end portion of the cassette pressing member 17 for contacting with an end face 1b of the cassette 1. When the cassette 1 is stored in position on the cassette storing rack 2 in this manner, the cassette 1 is not urged toward the cassette transporting means side. Consequently, even if the cassette locking projection 19 should be disengaged from an end face 1c of the cassette 1, the cassette 1 will not be pushed out toward the cassette transporting means side at all. Accordingly, the cassette 1 is stored in safety on the cassette storing rack 2.

Subsequently, when the cassette 1 stored on the cassette storing rack 2 is to be pushed out in the direction of an arrow mark c to the cassette transporting means side 11 as shown in FIG. 5, a pushing means 40 provided on the cassette transporting means 4 pushes an end face 16a of the sliding member 16 on the cassette transporting means side in the direction of an arrow mark d. Thereupon, the sliding member 16 is once moved to the position shown in long and short dash lines in FIG. 4 by a guiding action of the arcuate portion 22a of the elongated hole 22 so that the cassette locking projection 19 escapes in the direction of the arrow mark b from a side face 1d of the cassette 1, whereafter the sliding member 16 is moved in the direction of an arrow mark e to the advanced or extended position under the guidance of the elongated holes 22 and 23 and the cooperating guide pins 24 and 25. Thereupon, however, the rack 21 of the sliding member 16 is engaged with the sector gear 32 of the rotatable member 18 and rotates the rotatable member 18 in the direction of an arrow mark f so that the sector gear 33 of the rotatable member 18 drives the rack 27 of the cassette pressing 17 to move the cassette pressing member 17 in the direction of the arrow mark c to the advanced or extended position under the guidance of the elongated hole 28, guide pin 29 and two guide tabs 30. As a result, the abutting projection 34 of the cassette pressing member 17 presses against the end face 1b of the cassette 1 in the direction of the arrow mark c as shown in FIG. 3 so that the cassette 1 is pushed out from the cassette storing rack 2 to the cassette transporting means 4 side. Thereupon, the cassette 1 is inserted in the direction of the arrow mark c into a cassette holding portion 4a of the cassette transporting means 4 and thereafter held in the latter. It is to be noted that, in this instance, since the radius of the sector gear 33 is greater than the radius of the sector gear 32 as seen in FIG. 5, the stroke of movement of the cassette pressing member 17 in the direction of the arrow mark c is greater than the stroke of movement of the sliding member 16 in the direction of the arrow mark e so that the cassette pressing member 17 inserts the cassette 1 with certainty into the cassette transporting means 4.

By the way, when the sliding member 16 remains at the returned position as shown by solid lines in FIG. 4, the rack 21 is held out of meshing engagement with the sector gear 32 of the rotatable member 18. Accordingly, even if the abutting projection 34 of the cassette pressing member 17 is inadvertently pushed, when the cassette 1 is stored in position on the cassette storing rack 2 as shown in two-dot chain lines in FIG. 4, in the direction of the arrow mark c from the operator side to cause the rack 27 of the cassette pressing member 17 to rotate the rotatable member 18 in the direction of the arrow mark f via the sector gear 33, the sliding member 16 will not be moved in the direction of the arrow mark e at all. Accordingly, the cassette locking projection 19 is not released inadvertently in the direction of the arrow mark b, and consequently, even if the abutting projection 34 is pushed inadvertently in the direction of the arrow mark c, the end face 1c of the cassette 1 is contacted with the cassette locking projection 19 and thus prevents the cassette 1 from being pushed out inadvertently to the cassette transporting means side 11.

In summary, unless the sliding member 16 is pushed in the direction of the arrow mark d by the pushing means 40 of the cassette transporting means 4 as shown in FIG. 5, the cassette 1 stored in position on the cassette storing rack 2 cannot be pushed out inadvertently to the cassette transporting means side 11 by any other external force.

Figure 6:
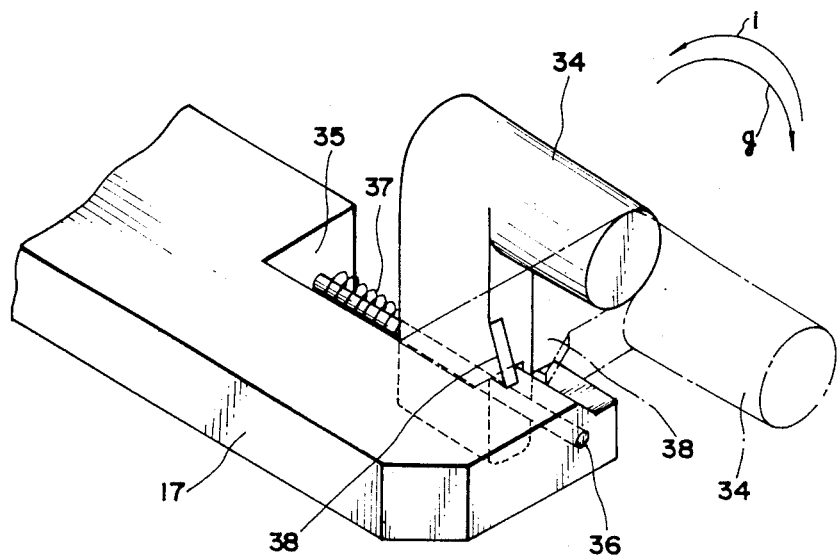
FIG. 6 is an enlarged perspective view showing details of a cassette pressing member of the cassette storing rack of FIG. 4.
Figure 7:
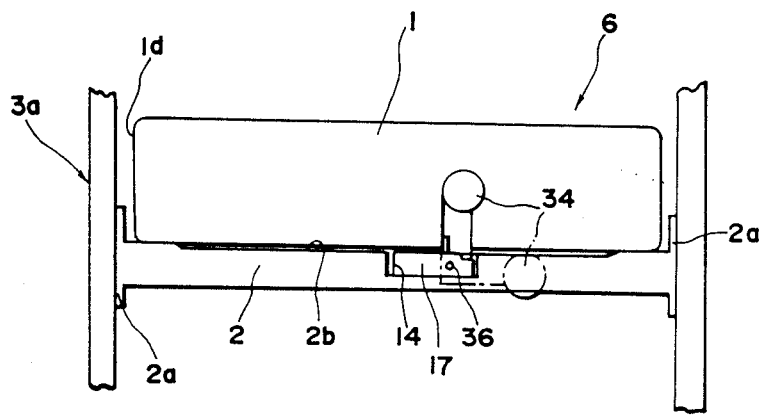
FIG. 7 is a side elevational view of one of cassette storing racks of the automatic cassette changer of FIG. 1, in an enlarged scale, as viewed from the side remote from a cassette transporting means.

Referring to FIG. 6, the abutting projection 34 is mounted for pivotal motion by means of a fulcrum pin 36 in a recess 35 formed in the cassette pressing member 17 between an abutting position shown in solid lines in FIG. 7 in which it stands up substantially vertically above the cassette pressing member 17 and a canceling position shown in long and short dash lines in FIG. 7 in which it lies substantially horizontally and substantially in level with the cassette pressing member 17. The abutting projection 34 is normally urged to return to the abutting position by a torsion coil spring 37 which serves as a returning urging means. A stopper 38 is formed in an integral relationship on the abutting projection 34 and engages, in the abutting position of the abutting projection 34, with an upper face of the cassette pressing member 17 to hold the abutting projection 34 in its substantially vertically extending condition. A recess 39 for allowing insertion of a finger of a hand therein is formed at a portion of the cassette storing rack 2 on the operator side 6 as shown in FIG. 4.

Accordingly, when the abutting projection 34 is pivoted down in the direction of an arrow mark g from the abutting position shown in solid lines in FIG. 6 to the canceling position shown in long and short dash lines in FIG. 6 around the fulcrum pin 36 against the spring 37, then it is possible to grip the cassette 1 by hand and pull the cassette 1 freely in the direction of an arrow mark h, that is, toward the operator side 6 side out of the cassette storing rack 2 as seen in FIG. 3. Or reversely, the cassette 1 thus pulled out can be freely inserted from the operator side 6, that is, in the direction of the arrow mark c onto the cassette storing rack 2. It is to be noted that if the finger of the hand is released from the abutting projection 34 pivoted down in the direction of the arrow mark g, then the abutting projection 34 is pivoted in the direction of an arrow mark i by the spring 37 and automatically returned to the abutting position.

Figure 8:
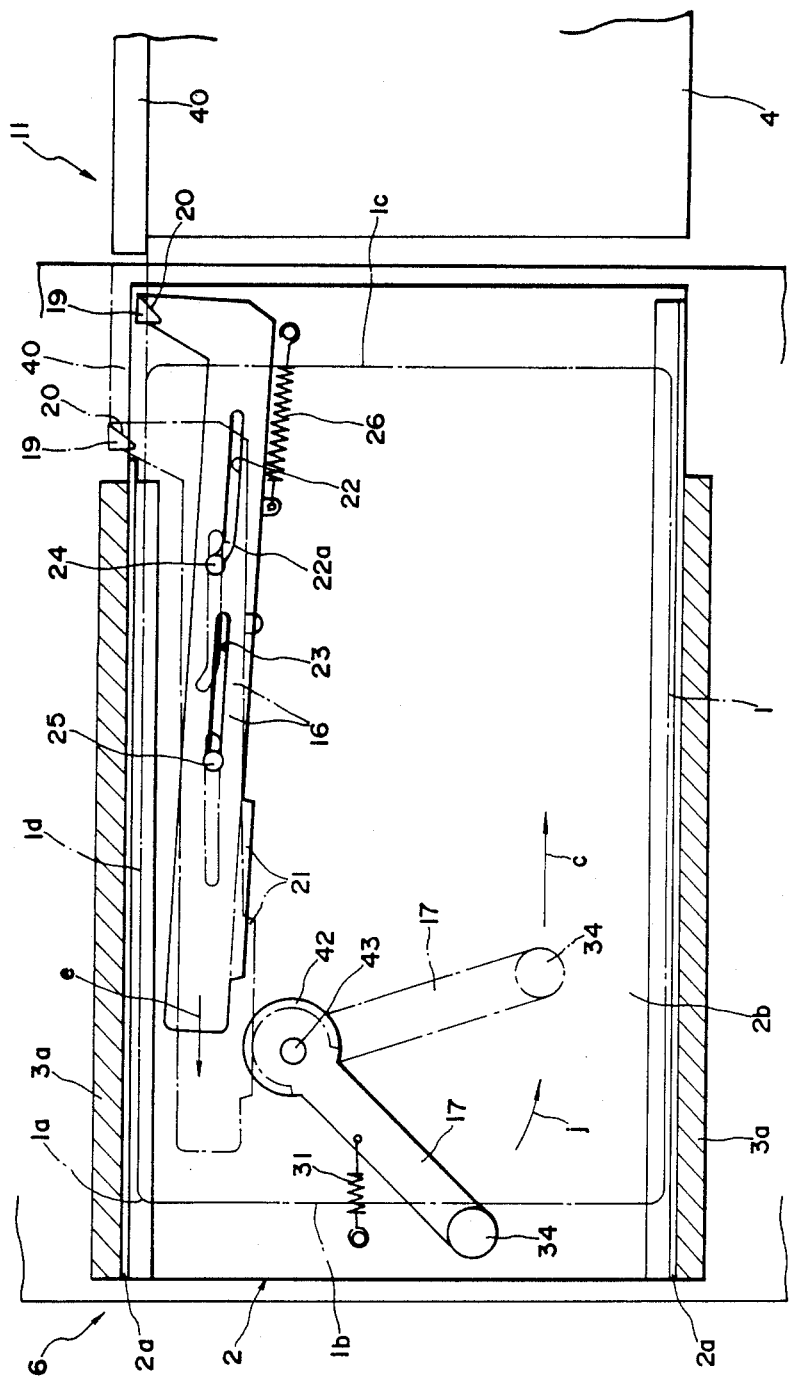
FIG. 8 is a plan view of a cassette storing rack of an automatic cassette changer showing a second embodiment of the present invention.
Figure 9:
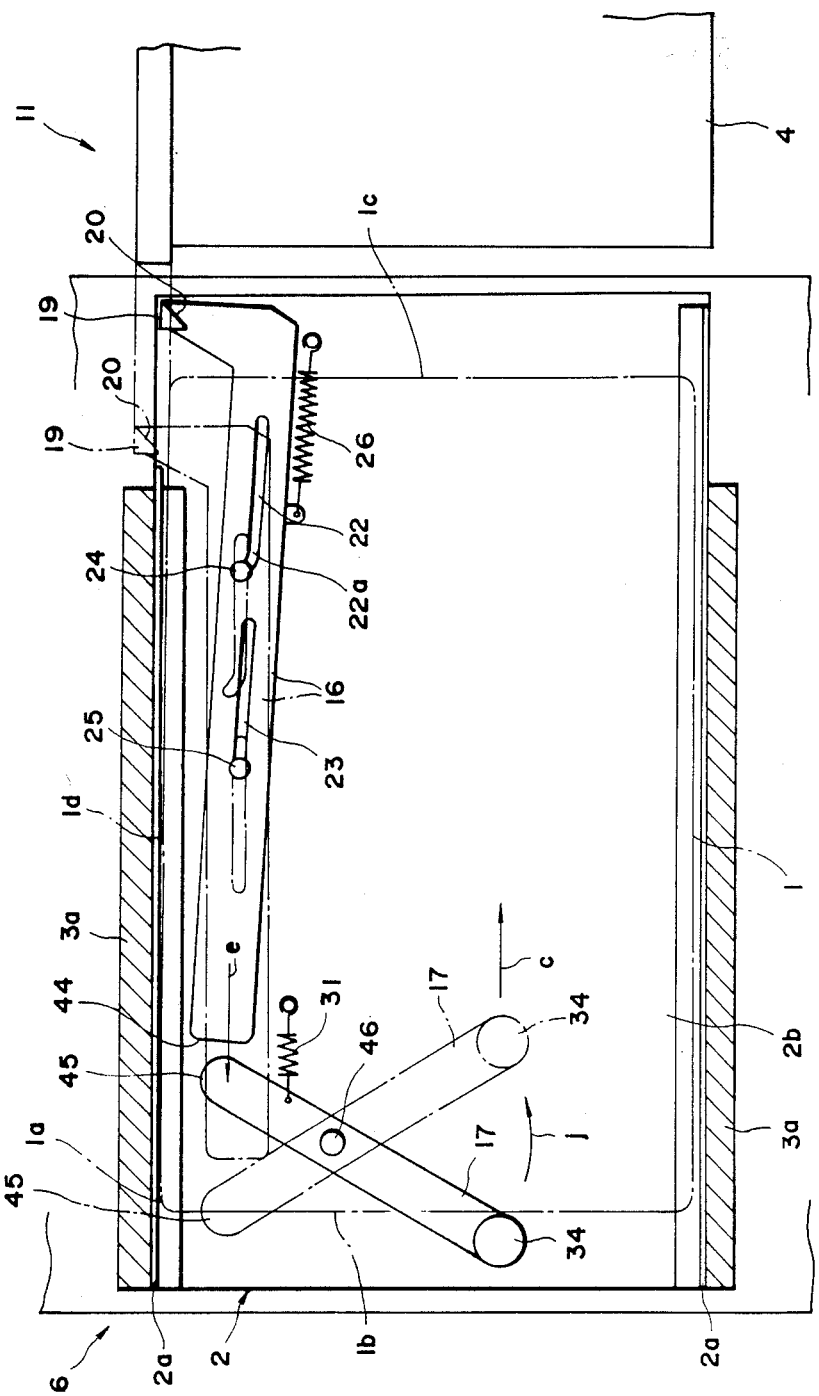
FIG. 9 is a similar view but showing a third embodiment of the present invention.

Referring now to FIGS. 8 and 9, second and third embodiments of the present invention are shown which each includes a modified form of the interlocking mechanism between the sliding member 16 and the cassette pressing member 17 of the first embodiment shown in FIGS. 1 to 7. It is to be noted that like parts or elements are denoted by like reference numerals to those of the first embodiment and description thereof is omitted herein to avoid redundancy.

Referring first to FIG. 8, the interlocking mechanism shown is such a modification that, when a sliding member 16 is moved in the direction of an arrow mark e, a gear 42 of a cassette pressing member 17 is driven by a rack 21 of the sliding member 16 to pivot the cassette pressing member 17 in the direction of an arrow mark j around a fulcrum shaft 43 so that a cassette 1 may be pushed out in the direction of the arrow mark c by an abutting projection 34 of the cassette pressing member 17.

Referring now to FIG. 9, the interlocking mechanism shown is such a modification that, when a sliding member 16 is moved in the direction of an arrow mark e, a free end 45 of a cassette pressing member 17 is pushed by an end 44 of the sliding member 16 to turn the cassette pressing member 17 in the direction of an arrow mark j around a fulcrum shaft 46 so that a cassette 1 may be pushed out in the direction of an arrow mark c by an abutting projection 34 of the cassette pressing member 17.

Referring now to FIGS. 10 to 16, there is shown an automatic cassette changer according to a fourth embodiment of the present invention wherein a sliding member on which a cassette locking element is formed in an integral realationship is formed as a locking member in the form of a rod so that a locking mechanism and an unlocking mechanism for a cassette can be disposed in a very small spacing in each of cassette storing racks.

Figure 10:
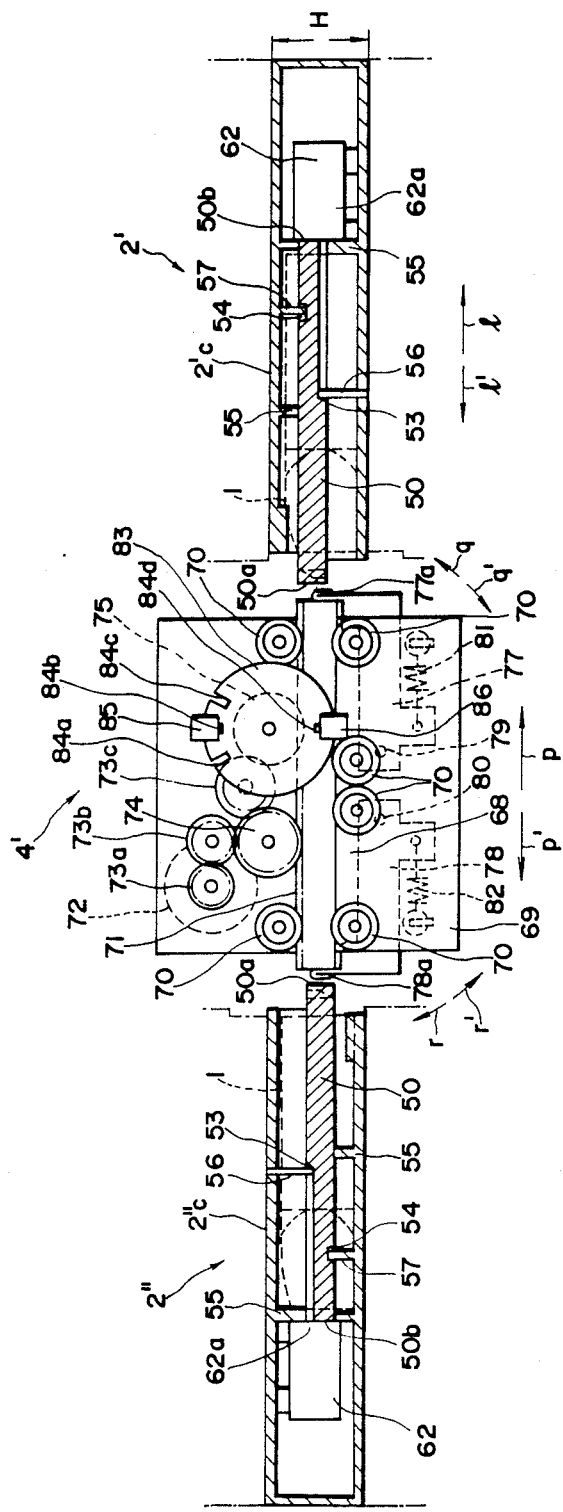
FIG. 10 is a partial vertical sectional view of an automatic cassette changer showing a fourth embodiment of the present invention.
Figure 11:
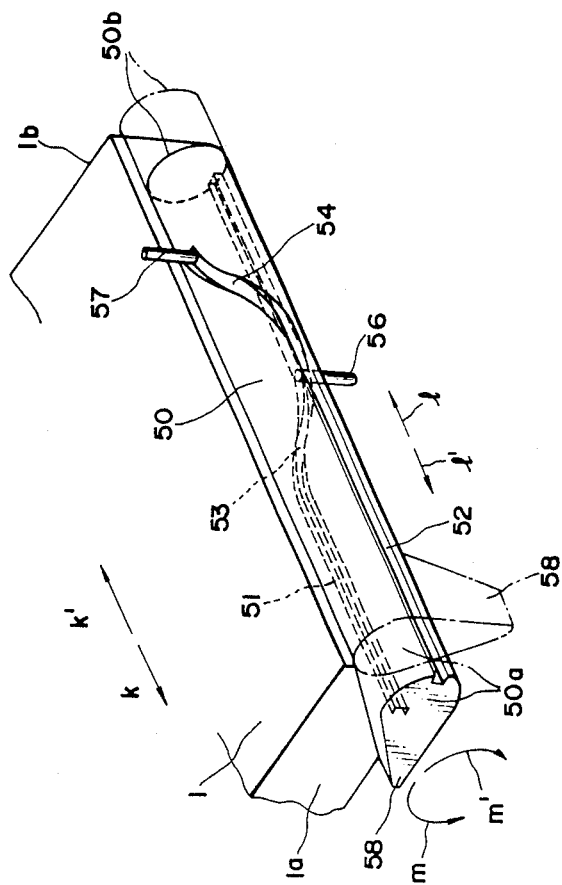
FIG. 11 is a partial perspective view, in an enlarged scale, showing a detailed structure of a locking member of the automatic cassette changer of FIG. 10.

Referring first to FIG. 10, a plurality of cassette storing racks 2' and 2" are formed in the same configuration from a synthetic resin material. The cassette storing racks 2' and 2" are disposed in a vertically reverse relationship to each other and in an opposing relationship to each other on front and rear opposite sides of a passage 5 of movement of a cassette transporting means 4'. A locking member 50 in the form of a rod molded from a synthetic resin material is provided at a side portion 2'c or 2"c of each of the cassette storing racks 2' and 2". Accordingly, the locking members 50 on the cassette storing racks 2' and 2" are positioned in an opposing relationship to each other on the opposite sides of the passage 5 of movement of the cassette transporting means 4'. Since the individual cassette storing racks 2' and 2" have the same construction as described above, the following description will given only of the cassette storing rack 2'. As shown in FIG. 11, the locking member 50 is disposed such that the direction of an axis thereof may substantially coincide with the direction of storing and discharging movement of a cassette 1, that is, the directions of the arrow marks k' and k. A pair of guide grooves 51 and 52 are formed linearly from an end 50a of the locking member 50 along the direction of the axis on a circumferential wall of the locking member 50, and rear ends of the guide grooves 51 and 52 are formed as spiral guide grooves 53 and 54 which are directed in the same direction. The locking member 50 is supported by means of a plurality of ribs 55 formed in an integral relationship on a side portion 2'of the cassette storing rack 2' as shown in FIG. 10. A guide pin 56 is implanted vertically on a lower wall of the side portion 2'c and inserted in the guide groove 51 or 53 while another guide pin 57 is formed in an integral relationship on an upper wall of the side portion 2'c and inserted in the guide groove 52 or 54 as shown in FIG. 11. Accordingly, due to a guiding action between the guide grooves 51 to 54 and the guide pins 56 and 57, the locking member 50 is moved in the direction of an arrow mark 1 or 1' along the axis thereof and is rotated, upon such axial movement thereof, in the direction of an arrow mark m or m' around the axis thereof as shown in FIG. 11. Meanwhile, a locking element or portion 58 is formed in an integral relationship at the end 50a of the locking member 50 and extends substantially in a perpendicular direction to the axis of the locking member 50. Accordingly, the locking portion 58 is inserted to a position forwardly of the cassette 1 in the discharging direction upon rotation of the locking member 50 in the direction of the arrow mark m', but the locking portion 58 is moved away from the position forwardly of the cassette 1 in the discharging direction upon rotation of the locking member 50 in the direction of the arrow mark m.

Figure 12:
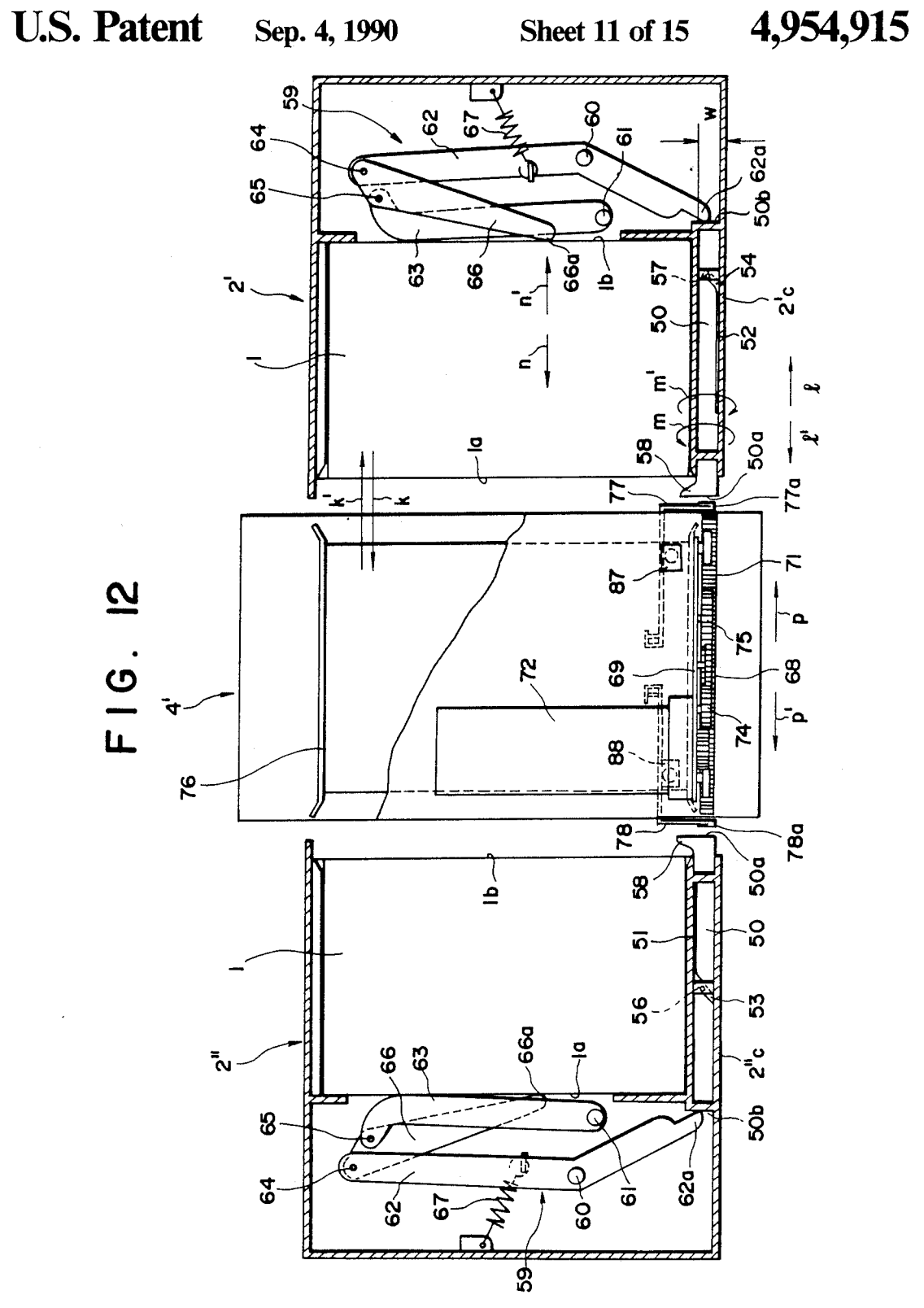
Figure 13:
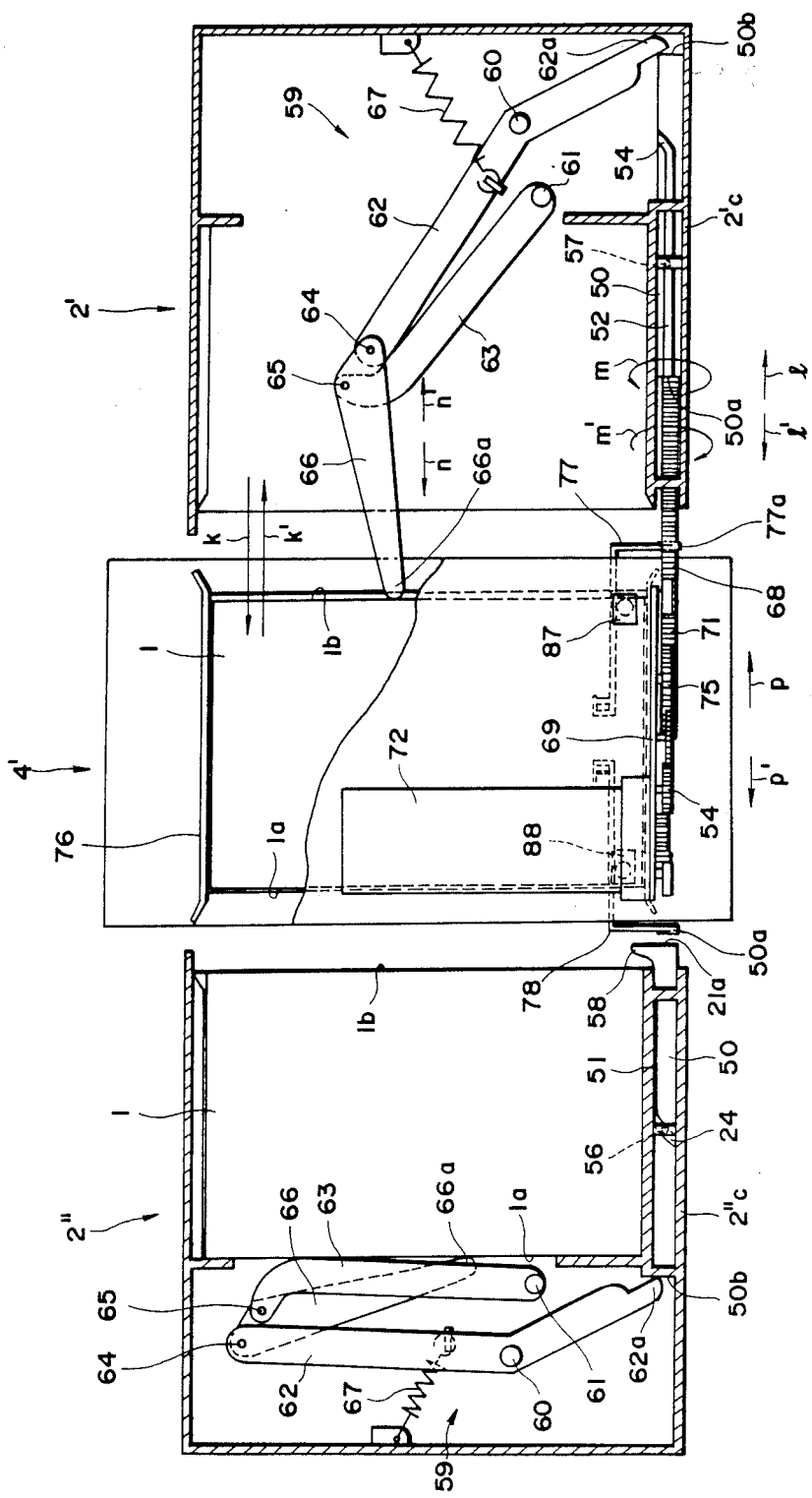
FIG. 13 is a similar view but illustrating a cassette discharging operation of a cassette storing rack of the automatic cassette changer of FIG. 10.

Referring now to FIGS. 12 and 13, a cassette pushing out member 59 is provided at a rear portion of the cassette storing rack 2' (similar with regard to 2"). The cassette pushing out member 59 is constituted from a quadric link mechanism composed of a pair of links 62 and 63 supported for pivotal motion on the cassette storing rack 2' and a further link 66 connected to ends of the links 62 and 63 by means of a pair of pivot shafts 64 and 65, respectively. The cassette pushing out member 59 is normally urged to return in the direction of an arrow mark n' by a tension coil spring 67 which extends between the link 62 and a rear portion of the cassette storing rack 2' so that an end portion 62a of the link 62 is held in contact with a rear end 50b of the locking member 50. Accordingly, if the locking member 50 is moved in the direction of the arrow mark l, the cassette pushing out member 59 is moved forwardly in the direction of an arrow mark n against the tension coil spring 67, but if the cassette pushing out member 59 is moved back in the direction of the arrow mark n' by the tension coil spring 67, the locking member 50 is moved in the direction of the arrow mark l' together with the cassette pushing out member 59. It is to be noted that the movement of the locking member 50 in the direction of the arrow mark l' is stopped by the guide pin 57 which also serves as a stopper.

Referring back to FIG. 10, a thrusting out member 68 is provided on the cassette transporting means 4' which is moved in the spacing between the opposing cassette storing racks 2' and 2". The thrusting out member 68 is designed to actuate the cassette pushing out member 59 to move the cassette 1 from the cassette storing rack 2' 2" or into the cassette transporting means 4'.

As shown in FIG. 10, a support plate 69 is provided vertically at a side location of the cassette transporting means 4', and a plurality of guide rollers 70 are mounted on the front side of the support plate 69. The single thrusting out member 68 is supported for movement in the directions of arrow marks p and p' coincident with the directions of movement of the locking member 50 by means of the guide rollers 70. The thrusting out member 68 is in the form of a rod and has a rack 71 formed at an upper end edge thereof. A pinion 74 is driven to rotate via a pair of gears 73a and 73b by a motor 72 mounted on the rear side of the support plate 69, and another pinion 75 is driven to rotate via a further gear 73c by the pinion 74. The rack 71 is thus driven by forward or reverse rotation of the pinions 74 and 75 so that the single pushing out member 68 is selectively pushed out in the direction of the arrow mark p or p'. It is to be noted that, since the locking members 50 are disposed at symmetrical positions in the individual cassette storing racks 2' and 2" as described hereinabove, the ends 50a of the locking members 50 are selectively pressed by the opposite ends of the thrusting out member 68. In other words, the ends 50a of the locking members 50 serve as pressed portions by the cassette pushing put members 59.

Referring again to FIG. 12, a cassette holder 76 for holding a cassette 1 therein is provided in the cassette transporting means 4', and a pair of locking levers 77 and 78 for locking a cassette 1 in position are provided at opposite side portions below the cassette holder 76. As shown in FIG. 12, the locking levers 77 and 78 are supported for pivotal motion in the directions of arrow marks q, and q' and r, r' on the support plate 69 by means of shafts 79 and 80, respectively, and are urged to pivot in the directions of the arrow marks q and r by a pair of tension coil springs 81 and 82 which extend between the locking levers 77 and 78 and the support plate 69, respectively. The locking levers 77 and 78 are thus movable from and to a position in which projections 77a and 78a thereof are positioned forwardly of the opposite ends of the thrusting out member 68. Meanwhile, a disk 83 is mounted on a surface of the pinion 75, and the thrust position of the thrusting out member 68 is judged by selectively detecting slits 84a, 84b, 84c and 84d formed in the disk 83 by means of a pair of sensors 85 and 86. Another pair of sensors 87 and 88 for detecting insertion of a cassette 1 are provided at upper locations of the cassette holder 76 as shown in FIG. 12.

Subsequently, locking and unlocking of a cassette 1 in a cassette storing rack 2' and movement of a cassette 1 between a cassette storing rack 2' and the cassette transporting means 4'.

Normally, a cassette 1 is stored in position in a cassette storing rack 2' as shown in FIGS. 10 to 12. Since the cassette pushing out member 59 is at its returned position moved in the direction of the arrow mark n' by the tension coil spring 67, the end portion 62a of the link 62 presses against the rear end 50a of the locking member 50 to hold the locking member 50 at the pposition moved in the direction of the arrow mark l'. Upon the movement of the locking member 50, the locking member 50 is rotated in the direction of the arrow mark m' so that the locking portion 58 of the locking member 50 is inserted to the position forwardly of the cassette 1 in the discharging direction (in the direction of the arrow mark k as shown in FIG. 11. Accordingly, even if the cassette 1 thereafter tends to move in the direction of the arrow mark k, a forward end portion 1a of the cassette 1 is contacted with the locking portion 58 so that the cassette 1 is locked from being discharged.

Figure 14:
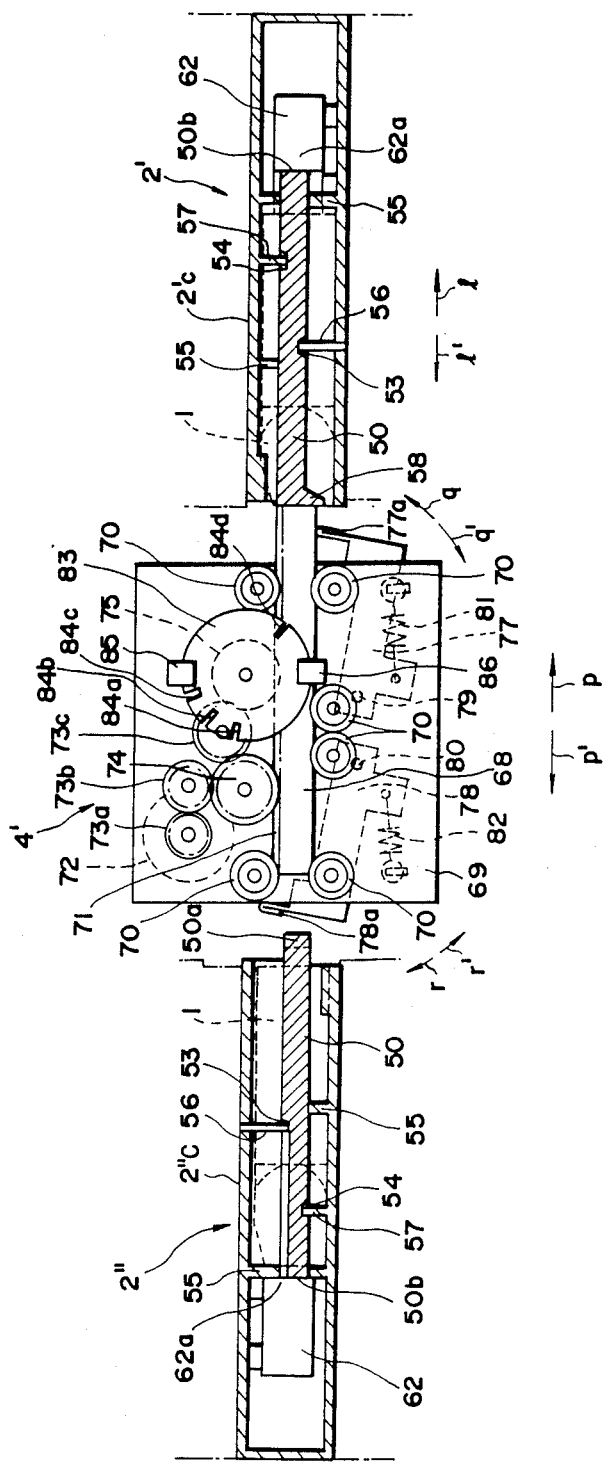
FIG. 14 is a similar view to FIG. 10 but illustrating a cassette unlocking operation of the cassette storing rack of FIG. 13.

Subsequently, the cassette transporting means 4' is moved to a position corresponding to a position of the cassette storing rack 2'. In this instance, the thrusting out member 68 of the cassette transporting means 4' is at its neutral position as shown in FIG. 10, and this condition is judged as the slits 84b and 84d of the disk 83 are detected by the sensors 85 and 86, respectively. Then, the thrusting out member 68 is thrust out in the direction of the arrow mark p by rotation of the motor 72 as shown in FIG. 14. Thereupon, an end of the thrusting out member 68 presses against the projected piece 77a of the locking lever 77 so that the locking lever 77 is pivoted in the direction of the arrow mark q'. As the thrusting out member 68 is further thrust out in the direction of the arrow mark p, the end thereof presses against the end 50a of the locking member 50 as seen in FIG. 14 so that the locking member 50 is moved in the direction of the arrow mark 1. Upon the movement, the locking member 50 is rotated in the direction of the arrow mark m as seen in FIG. 11 so that the locking portion 58 thereof is moved away from the position forwardly of the cassette 1 in the discharging direction. Accordingly, the locked condition of the cassette 1 is canceled so that the cassette 1 is permitted to move in the direction of the arrow mark k.

Since locking and unlocking of the cassette 1 are effected by rotation of the locking member 50 in the form of a rod around its axis, the spacing in which locking memnber 50 is disposed at the side portion 2'c of the cassette storing rack 2'can be reduced remarkably, and the thickness H of the cassette storing rack 2' is not increased while the increase W in width of the storing rack 2' is minimized.

Subsequently, as the thrusting out member 68 is further thrust out in the direction of the arrow p as shown in FIG. 15, the end of the thrusting out member 68 presses against the end 50a of the locking member 50 so that the locking member 50 is further moved in the direction of the arrow mark 1. Consequently, the rear end 50b of the locking member 50 presses against the end portion 62a of the link 62 so that the cassette pushing out member 59 is moved forwardly by a great stroke in the direction of the arrow mark n as seen in FIG. 13. Thereupon, the end 66a of the link 66 presses substantially against the center of a rear end portion 1b of the cassette 1 so that the cassette 1 is discharged in the direction of the arrow mark k and moved away from the cassette storing rack 2' into the cassette transporting means 4'. The movement of the thrusting out member 68 is stopped as the slit 84a of the disk 83 is detected by the sensor 86 as seen in FIG. 15. The thrusting out member 68 is thereafter moved in the direction of the arrow mark p' and returned to its neutral position shown FIG. 10. It is to be noted that, since the pinions 74 and 75 are provided in pair, even if the rack 71 is disengaged from the pinion 74, there will be no trouble in driving of the thrusting out member 68. As a result of the returning movement of the thrusting out member 68, the locking lever 77 is returned in the direction of the arrow mark q so that the cassette 1 is locked in position in the cassette holder 76 of the cassette transporting means 4'. Completion of insertion of the cassette 1 into the cassette holder 76 is detected by the sensor 87 shown in FIG. 12. Meanwhile, the cassette pushing out member 59 which has pushed out the cassette 1 from the cassette storing rack 2' is returned in the direction of the arrow mark n' by the tension coil spring 67 as shown in FIG. 12. Accordingly, also the locking member 50 is moved in the direction of the arrow mark 1' so that it is rotated in the direction of the arrow mark m' until it enters a locking condition again.

Subsequently, the cassette transporting means 4' which has received the cassette 1 in such a manner as described above is moved to the position of a VTR (video tape recorder) 8, and the cassette 1 is forwarded into the VTR 8. Then, desired reproduction or recording is made with the cassette 1, and after then, the cassette 1 is forwarded into the cassette transporting means 4' again. The cassette transporting means 4' is thus moved to the position of the original cassette storing rack 2' as shown in FIG. 16. There, the thrusting out member 68 is thrust out in the direction of the arrow mark p again. Thereupon, the end of the thrusting out member 68 presses against the projected piece 77a of the locking lever 77 so that the locking lever 77 is pivoted in the direction of the arrow mark q'. Consequently, locking of the cassette 1 in the cassette holder 76 is canceled. When the slit 84c of the disk 83 is detected by the sensor 85, the thrusting out member 68 is stopped and then returned to its neutral position again. The cassette 1 is then pushed out in the direction of the arrow mark k' by a thrusting out member not shown of the cassette transporting means 4' as shown in FIG. 12.

Thereupon, the rear end 1b of the cassette 1 presses against the locking portion 58 of the locking member 50 in its position pivoted in the direction of the arrow mark m' so that the locking member 50 is moved in the direction of the arrow mark 1. Consequently, the locking member 50 is rotated in the direction of the arrow mark m so that the locking portion 58 is moved away from the position forwardly of the cassette 1 in the storing direction. Accordingly, the locking condition of the locking member 50 is canceled so that the cassette 1 is moved in the direction of the arrow mark k' and stored into the cassette storing rack 2'. Then, after the cassette 1 has been stored completely in position, the cassette 1 is locked again by the locking portion 58 of the locking member 50 from being discharged from the cassette storing rack 2'.

By the way, since the locking members 50 are disposed in symmetrical positions in the individual cassette storing racks 2' and 2" and the single thrusting out member 68 of the cassette transporting means 4' can be thrust out in the opposite directions, that is, in the directions of the arrow marks p and p', locking and unlocking of the cassette 1 in the cassette storing rack 2', discharging of the cassette 1 from the cassette discharging rack 2' into the cassette transporting means 4', and storing of the cassette 1 from the cassette transporting means 4' into the cassette storing rack 2' described hereinabove are performed in a quite similar manner also on the cassette storing rack 2" side. Since the mechanism for pressing the locking member 50 for each of the cassette storing racks 2' and 2" is composed only of the single thrusting out member 68, the structure thereof is very simple and the number of components is also small, and besides the spacing of the mechanism is also very small.

Meanwhile, the locking member 50 has two functions including a function of locking the cassette 1 and another function as a pressed portion by the cassette pushing out member 59. Accordingly, locking and unlocking of the cassette 1 and full stroke discharging of the cassette 1 can be carried out only by operation of the single thrusting out member 68 of the cassette transporting means 4' which presses against the locking member 50. Besides, in such full stroke discharging of the cassette 1, a very large stroke can be obtained within a limited spacing in each of the cassette storing racks 2' and 2" by utilizing a quadric link mechanism.

Further, since locking and unlocking of the cassette in the cassette storing rack are effected using the locking member in the form of a rod which is designed for movement in the direction of the axis thereof and also for rotation around the axis thereof upon such movement thereof, the thickness of the cassette storing rack is not increased by the locking member, and the increase in width of the storing rack can be minimized. Accordingly, the individual cassette storing racks each having the locking and unlocking mechanisms can be made extremely compact so that it becomes possible to dispose a very larger number of cassette storing racks in a limited spacing in a device body, and the number of stored cassettes can be increased significantly.

While the embodiments of the present invention have been described hereinabove, the present invention is not limited to the specific embodiments, and various alterations and modifications can be made without departing from the scope and spirit of the present invention.

It is to be noted that the application of the present invention is not limited to a feeding device for a video tape cassette and the present invention can be applied to feeding devices for various cassettes in which various tapes, disks or the like are stored.

What is claimed is:

1. An automatic cassette changer which includes a plurality of cassette storing racks each for storing A cassette therein and a cassette transporting means for transporting a cassette to a recording or reproducing device, said cassette transporting means including a pushing means and each of said cassette storing racks including a sliding member disposed to be pushed by said pushing means provided on said cassette transporting means to move in a direction away from said cassette transporting means and a cassette pressing member connected with said sliding member and disposed to be moved in response to movement of said sliding member in a direction toward said cassette transporting means by a distance proportional to the amount of movement of said sliding member, said cassette pressing member having an end portion thereof remote from said cassette transporting means, and said end portion being formed with an abutting portion for abutting a face of the cassette stored in the cassette storing rack for ejecting said cassette from said rack in a direction toward said cassette transporting means.

2. An automatic cassette changer according to claim 1, wherein each of said cassette storing racks further includes a first urging means extending between part of said sliding member and a portion of the cassette storing rack adjacent said cassette transporting means, and a second urging means extending between part of said cassette pressing member and a portion of the cassette storing rack remote from said cassette transporting means.

3. An automatic cassette changer according to claim 1, wherein said sliding member and said pressing member are mounted in a spaced relationship by a predetermined distance from each other for movement in directions parallel to directions in which the cassette is respectively inserted into the and discharged from the cassette storing rack and are formed with racks on sides thereof opposing each other, and each of said cassette storing racks further includes a sector gear for meshing with said racks provided on said sliding member and said pressing member, whereby said sliding member and said pressing member move respectively in opposite directions.

4. An automatic cassette changer according to claim 1, wherein said abutting portion is mounted at an end portion of said cassette pressing member for pivotal motion between a position in which said abutting portion can be contacted with the cassette stored in the cassette storing rack and another position in which said abutting portion cannot be contacted with the cassette stored in the cassette storing rack.

5. An automatic cassette changer according to claim 1, wherein said sliding member has, at an end portion thereof adjacent said cassette transporting means, a locking portion for contacting with a side face of the cassette stored in the casette storing rack adjacent said cassette transporting means.

6. An automatic cassette changer which includes a plurality of cassette storing racks each for storing a cassette therein and a cassette transporting means for transporting a cassette to a recording or reproducing device, each of said cassette storing racks including a locking member elongated along an axis and extending in a direction substantially parallel to directions in which a cassette is loaded into and discharged from said rack and movable in a direction parallel to said axis and rotatable in a circumferential direction about said axis;

a spiral guide portion formed on an outer periphery of said locking member, guide pin means cooperating with said spiral guide portion so that, as said locking member is rotated in a circumferential direction, said locking member may be moved in directions parallel to said axis, and said locking member having a locking portion extending from an end portion thereof adjacent to said cassette transporting means in a direction substantially perpendicular to said axis, said locking portion being disposed to abut a cassette stored in the cassette storing rack.

7. An automatic cassette changer according to claim 6, wherein each of said cassette storing racks includes a pushing out member having an end for contacting with part of said locking member and is disposed to be moved in a direction toward said cassette transporting means by a distance proportional to the amount of movement of said locking member in a direction of the axis of said locking member by said locking member to push out the cassette from the cassette storing rack.

* * * * *